United States Patent
O'Neil et al.

(10) Patent No.: US 9,699,849 B2
(45) Date of Patent: Jul. 4, 2017

(54) LED DRIVER WHICH CAN BE USED WITH EITHER TRAILING EDGE OR LEADING EDGE DIMMERS

(71) Applicant: EPtronics, Inc., Gardena, CA (US)

(72) Inventors: Tom O'Neil, Gardena, CA (US); Lee Chiang, Gardena, CA (US)

(73) Assignee: EPTRONICS, INC., Gardena, CA (US)

( * ) Notice: Subject to any disclaimer, the term of this patent is extended or adjusted under 35 U.S.C. 154(b) by 0 days.

(21) Appl. No.: 14/843,722

(22) Filed: Sep. 2, 2015

(65) Prior Publication Data

US 2016/0381745 A1    Dec. 29, 2016

Related U.S. Application Data

(60) Provisional application No. 62/185,380, filed on Jun. 26, 2015.

(51) Int. Cl.
*H05B 37/02*     (2006.01)
*H05B 33/08*     (2006.01)

(52) U.S. Cl.
CPC ......... *H05B 33/0845* (2013.01); *H05B 33/08* (2013.01); *H05B 33/0809* (2013.01); *H05B 33/0815* (2013.01); *H05B 33/0887* (2013.01); *H05B 37/02* (2013.01)

(58) Field of Classification Search
CPC .... H05B 33/08; H05B 37/02; H05B 33/0809; H05B 33/0812; H05B 33/0845; H05B 33/0887
USPC ..................... 315/200 R, 224, 294, 297, 307
See application file for complete search history.

(56) References Cited

U.S. PATENT DOCUMENTS

| 7,579,814 B2 * | 8/2009 | Orr | H02M 3/155 323/225 |
| 7,852,649 B2 * | 12/2010 | Hsiao | H02M 1/08 363/97 |
| 8,213,190 B2 * | 7/2012 | Li | H02M 1/34 363/16 |
| 2011/0025217 A1 * | 2/2011 | Zhan | H05B 33/0815 315/219 |
| 2011/0309759 A1 * | 12/2011 | Shteynberg | H05B 33/0815 315/201 |
| 2015/0342004 A1 * | 11/2015 | Athalye | H05B 33/0887 315/85 |

OTHER PUBLICATIONS

Silergy, Single Stage Flyback and PFC Controller with Primary Side Control for LED Lighting and TRAIC Dimming/NO-Dimming device option preliminary datasheet.

* cited by examiner

*Primary Examiner* — Tung X Le
(74) *Attorney, Agent, or Firm* — Clement Cheng

(57) ABSTRACT

A phase control dimming LED driver is able to achieve complete stabilization of both TRIAC and trailing edge dimmers by using a large inductor to limit the inrush normally associated with the switching on of the TRIAC during each half cycle. Such a large inductor is not normally used because when a trailing edge dimmer is applied, a damaging voltage surge known as "ring up" can be generated when the trailing edge dimmer switch turns off. In this invention the inductor is placed after the input rectifier bridge and equipped with a diode and resistor which allow the energy in the inductor at the moment when a trailing edge dimmer switches off to be harmlessly dissipated.

4 Claims, 4 Drawing Sheets

LED DRIVER WHICH CAN BE USED WITH EITHER TRAILING EDGE OR LEADING EDGE DIMMERS

FIELD OF THE INVENTION

The present invention is in the field of LED driver circuits which are dimmable using either forward phase control (leading edge) dimmers or reverse phase control (trailing edge) dimmers. In particular the invention relates to extracting the phase information from the phase control power and stabilizing either forward or reverse phase control dimmers in the presence of a conventional EMI filter.

DISCUSSION OF RELATED ART

In constructing a dimming driver to work with either forward (LE) or reverse phase control (TE) there are several problems to be overcome:
  a) It is desirable to make the dimming level respond to the phase angle of the dimming signal, not to the power line voltage, since otherwise every minor glitch on the power line would be translated into a dimming signal. This means that the phase angle information must be extracted and used to control the dimming level.
  b) When the triac switches on at the leading edge of a LE dimming signal, a powerful surge of current is likely to rush in to charge up the emi X caps which are conventionally used at the front end of a driver. Since there is likely to be inductance present, this surge will continue after the capacitor is charged up to the peak of the line, so that eventually the capacitor is charged up beyond the peak of the line voltage and then discharges backwards out towards the triac. This will cause the triac to shut down. After a short period of time the triac trigger circuitry will retrigger the triac so that it switches on again, so that the triac will continually switch on and off at a relatively high frequency, generating noise.
  c) When a TE dimmer switches off at the end of its half cycle, if there is an inductor present, typically for emi filtering, then the inductor may produce a high voltage inductive kick back which might damage the dimmer or even the driver itself.

All of these issues were present with dimmable electronic ballasts before LED drivers came along, and so some of the examples which follow are drawn from electronic ballast technology. A first set of examples relate to extracting the phase control signal. In the phase control dimming a ballast described by inventor Venkitasubrahmanian in U.S. Pat. No. 5,604,411, a signal is extracted from the phase controlled input voltage which is simply a voltage proportional to the rms voltage coming out of the triac. As mentioned above, this is undesirable because power line variations are converted into dimming control signals. Liu in U.S. Pat. No. 8,497,637 does essentially the same thing with an LED driver. Shackle in U.S. Pat. No. 8,203,276 extracts the phase angle of the phase control signal by charging a capacitor with a current source while the phase control signal is on thus producing a voltage proportional to the on time. Sun in US application 20150002036 published Jan. 1, 2015 does essentially the same thing using a digital timer.

A second set of examples relate to dealing with the inrush surge when a triac switches on during each half cycle. As mentioned above, the fundamental issue here is that a capacitor typically in the emi circuitry gets overcharged because an associated inductor, which may even be in the dimmer, continues to force charge into the capacitor after the peak of the line, thus charging the capacitor up to a voltage greater than the peak of the line. The capacitor then discharges back into the triac circuit, commutating the triac to off. A short while later the triac control circuit switches it back on again with the result that a noisy, unstable oscillation results. This is generally known as triac instability. A parameter associated with this is the so called holding current of the triac, which is the least current that can keep the triac latched on. The triac current does not have to reverse completely to precipitate triac instability, it only needs to drop below the level of the holding current. There are many schemes for overcoming triac instability of which only a small number are reviewed here. One of the simplest fixes is to put a so called bleeder resistor across the input to the driver. The current through the resistor constitutes a continual load upon the triac which overcomes the outgoing current that would otherwise commutate the triac. This kind of circuit wastes a lot of power. For example in the patent of inventor Liu U.S. Pat. No. 8,497,637, a 5 W resistor is specified for the bleeder function. A more sophisticated variant is to only switch the bleeder on at low power levels, so that power is not wasted at full brightness. The load of the LED driver itself can serve to provide a sufficient bleeder current in many circumstances. At full dim levels this does not apply, and in U.S. Pat. No. 7,872,427 inventor Scianna describes putting in a dummy load which progressively switches on at low dim levels, placed across the input. Inventor Shackle in U.S. Pat. No. 8,203,276 has a power resistor which is driven by a pulse width modulator (PWM) voltage which is the inverse of the waveform applied to the LEDs—thus as the power to the LEDs decreases, the power drawn by the power resistor increases, maintaining a sufficient current drain to allow the triac to operate normally. Other variations include using a current source instead of a resistor. Another common scheme is to place across the rectified power line a power resistor in series with a relatively big capacitor. The resistor stops the capacitor from charging instantaneously when the triac switches on, so that when the emi X cap is about to start discharging a current out of the input, the capacitor in series with the resistor is still charging strongly and provides a sufficient net inflow of current to prevent any outflow from commutating the triac. One of the simplest schemes was described by Venkitasubrahmanian, in U.S. Pat. No. 5,604,411. A large inductor is placed in series with each input terminal of the product. When the triac switches on, the current builds up so slowly that the X capacitors never get overcharged.

The problem with the Venkitasubrahmanian approach is that if this same circuit is used for a TE dimmer, that the big inductors will produce a powerful inductive kick back at the moment that the dimmer switches off the current, sufficient to damage either the dimmer or the driver itself. In practice this concern has led designers of LED drivers intended to work on both LE and TE dimming to limit the size of the inductors used, in order to keep the inductive kick back (ring up) down to an acceptable level. For example Shackle in U.S. Pat. No. 8,203,276 combined two series inductors with a resistor capacitor damper and still had to provide a dummy load to keep the triac current above the holding current level at low dim levels.

It is apparent from the foregoing that there is a need for a simple input circuit to a phase control dimmable LED driver which can fully stabilize a triac (LE) dimmer without causing excessive ring up when a trailing edge (TE) dimmer is applied, and simultaneously extract the phase angle information from the phase control voltage waveform.

SUMMARY OF THE INVENTION

The invention can be applied to essentially any architecture of power converter which is to be phase controlled. As an illustrative embodiment we describe here its use in a primary side regulated flyback converter, using the Silergy™ SY5801 chip. Those skilled in the art will know that there are many other LED power converter chips which can perform this function. The data sheet for the SY5801 includes a basic application circuit which is incorporated herein by reference.

The Silergy™ SY5801 is a typical power converter chip with a Single Stage Flyback And PFC Controller With Primary Side Control For LED Lighting and TRAIC Dimming/NO-Dimming device option. The datasheet explains that, "The SY5801 is a single stage Flyback controller targeting at LED lighting applications. It is a primary side controller without applying any secondary feedback circuit for low cost, and drives the Flyback converter in the quasi-resonant mode to achieve higher efficiency. It can detect the TRIAC dimming signal to realize the dimming function."

The invention contains a pair of input terminals operative to be connected to the AC power line. A conventional fuse is present in series with one of the power line terminals, and then a conventional MOV protector is placed across the line followed by a common mode emi transformer which is present to prevent electromagnetic interference (emi) from getting out on to the power line. An X cap placed across the power line behind the common mode filter works in conjunction with it to enable the emi function. The two power line wires are then connected to a bridge rectifier, to produce respective positive and negative power inputs for the power converter. To limit current surge when a control triac fires, prior art inventors such as Shackle in U.S. Pat. No. 8,203,276 entitled Phase Control Dimming LED Driver System And Method Thereof issued Jun. 19, 2012, the disclosure of which is incorporated herein by reference, and Venkitasubrahmanian in U.S. Pat. No. 5,604,411 entitled Electronic Ballast Having A Triac Dimming Filter With Preconditioner Offset Control issued Feb. 18, 1997, the disclosure of which is incorporated herein by reference, placed large inductors between the power line and the circuit terminals. These inductors had to be limited in their size and effectiveness because of the excessive voltages associated with ring up. With triac dimmers there is a similar but smaller issue when the inductive current drives up the voltage on the X caps above the power line voltage, also sometimes referred to as ring up. In the present invention the triac filtering inductor is made much larger, for illustrative example only 35 mH instead of say, 4.7 mH. It is placed behind the bridge rectifier instead of in front of it. This large inductor very effectively limits surges of current each time that the triac turns on. Even if the X cap gets slightly overcharged by, for example, the inductor inside the triac dimmer, the current which continues to build up slowly in the triac filtering inductor ensures that the triac current remains unidirectional during each half cycle. At the end of a half cycle the inductor current is likely to still be flowing. Also with a TE dimmer the inductor current will still be flowing when the dimmer switch opens. To accommodate these circumstances, a diode is placed across the inductor with its anode adjacent the positive terminal of the bridge rectifier. When the dimmer switch opens, the inductor current can simply continue to "freewheel" through the diode and inductor. A resistor is placed in series with the diode to cause the freewheeling current to ramp down. In order to get a clean version of the triac dimming waveform to the control chip, a second bridge rectifier can be placed with its inputs in parallel with those of the first bridge rectifier, and the output provides a clean version of the triac waveform for the control chip. The operation of the triac filtering inductor in this invention is characterized by the fact that the current through the inductor is unidirectional, in contrast to the operation of those described by prior art authors which were bidirectional.

All these features and advantages will become apparent with reference to the accompanying drawings and detailed description of the invention and claims.

It is an object of this invention to provide a simple input circuit to a phase control dimmable LED driver which can fully stabilize a triac (LE) dimmer without causing excessive ring up when a trailing edge (TE) dimmer is applied, and simultaneously extract the phase angle information from the phase control voltage waveform.

The following call out list of elements can be a useful guide in referencing the element numbering of the drawings.
21 Resistor
101 Fuse
102 Metal Oxide Varistor (MOV)
103 Power Line Terminal
104 Power Line Terminal
105 Common Mode Inductor
106 X Capacitor
107 Bridge Rectifier
108 Capacitor
109 Capacitor
110 Inductor
201 Control Chip
202 Mosfet
204 Transformer
205 Node
206 Resistor
207 Resistor
208 Zener Diode
209 Capacitor
210 Resistor
211 Capacitor
212 Capacitor
213 Resistor
214 Capacitor
215 Resistor
216 Capacitor
217 Resistor
218 Diode
219 Transistor
220 Capacitor 222 Zener Diode
224 Resistor
223 Diode
227 Diode
228 Capacitor
229 Terminal
230 Terminal
401 Inductor
402 Diode
403 Resistor
406 Node

DETAILED DESCRIPTION OF THE PREFERRED EMBODIMENT

Figure 1:
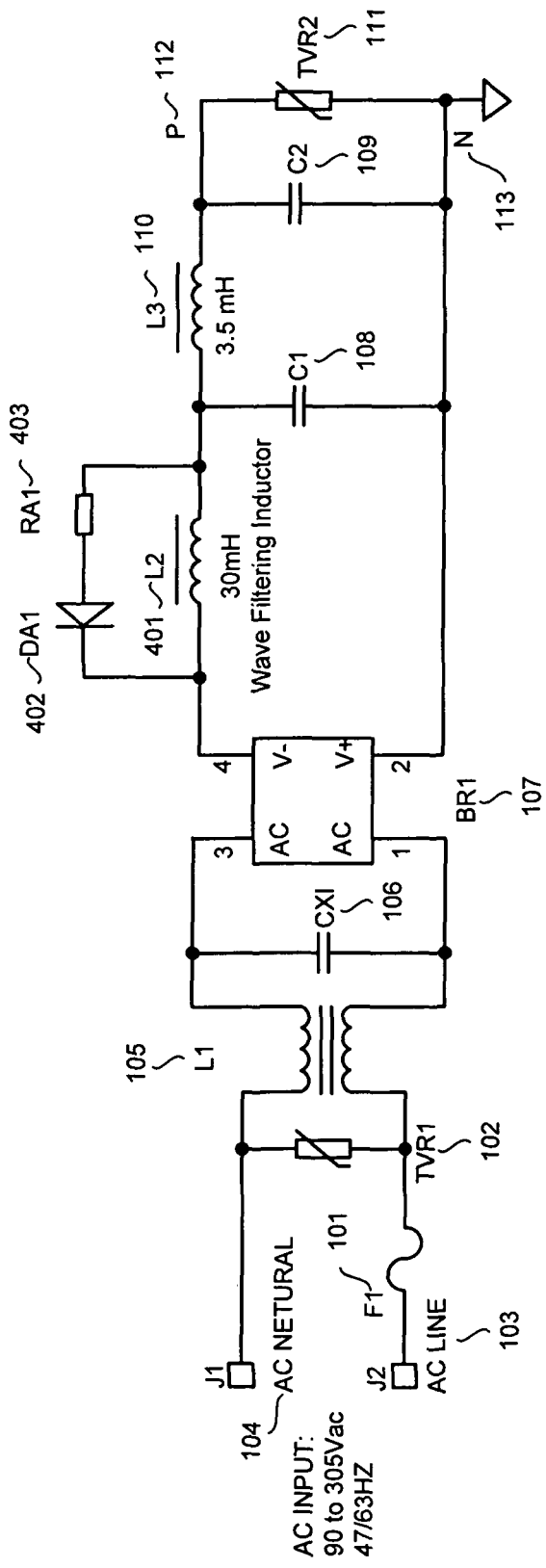
FIG. 1 is an input stage of a preferred embodiment of the invention.

The following glossary can be used for referencing terms of art by persons who are not of ordinary skill in the art.
PSR: primary side regulation
LE: leading edge dimmer, also called Triac™ dimmer
TE: trailing edge dimmer
Silergy™ SY5801: a power converter chip
TRIAC: from triode for alternating current, is a genericized tradename for an electronic component that can conduct current in either direction when it is triggered (turned on), and is formally called a bidirectional triode thyristor or bilateral triode thyristor. Triac is a short for Triode AC.
FCC: federal communications commission
X Cap: a type of capacitor Although a primary side regulation (PSR) flyback is described in the preferred embodiment, the inventive principle can be applied to any kind of power converter such as but not limited to a flyback, boost, buck boost or resonant converter. FIG. 1 shows the input stage which has terminals J1 and J2 which are connected to the power line terminals 103 and 104. The fuse 101 and the metal oxide varistor (MOV) 102 are conventional protection components well known to those skilled in the art. The combination of common mode inductor 105 and X cap 106 is a conventional emi filter needed to prevent excessive high frequency noise from getting out onto the ac power lines according to FCC requirements. Bridge rectifier 107 is connected behind the emi filter, and the triac filtering inductor 401 is connected to the positive output of the bridge rectifier. Diode 402 and resistor 403 are connected across inductor 401 with the anode of diode 402 connected to the positive terminal of bridge rectifier 107. Capacitor 108, inductor 110 and capacitor 109 represent a conventional pi filter for emi, needed because a flyback converter draws current discontinuously and so needs a powerful inductor/capacitor filter to smooth out the high frequency current fluctuations. The optional transient voltage suppressor TVR2 is present to prevent any high voltages from the power line getting to the power converter stage.

The inductor 401 together with diode 402 and resistor 403 are together called a "phase control wave filter". Their operation is as follows: When a triac dimmer triggers on, there will be a surge of current into X capacitor 106. The corresponding surge into capacitor 108 is greatly slowed by the large inductance of inductor 401. Even though capacitor 106 may be "rung up" by the inductance in the dimmer, when it gets to discharge back onto the power line inductor 401 is still steadily drawing an increasing current which overpowers the outflow from capacitor 106. When the power line voltage goes to zero, the current that was passing through inductor 401 instead passes through diode 402 and resistor 403, swiftly being attenuated to insignificance before the end of the next power line half cycle. When a trailing edge dimmer shuts off, again diode 402 forward biases and the inductor current continues through diode 402 until it is attenuated to insignificance by the action of resistor 403. In this manner the wave filter assembly protects the system from voltage spikes associated with phase control switching and prevents violent surges of current from resonating and causing instability. Another way of looking at the action of the wave filter is to look at energy transfers. In prior art dimmer stabilizing circuits, energy stored in the emi series inductors first charges up associated capacitors, and then is discharged back into the power line, making possible the well-known triac instability. By contrast, in the present invention the placement of the inductor behind the bridge rectifier prevents any charge being discharged back into the power line. Instead the energy accumulated in the inductor is dissipated in resistor 403 when the line current is interrupted by the mechanism of phase control.

Figure 2:
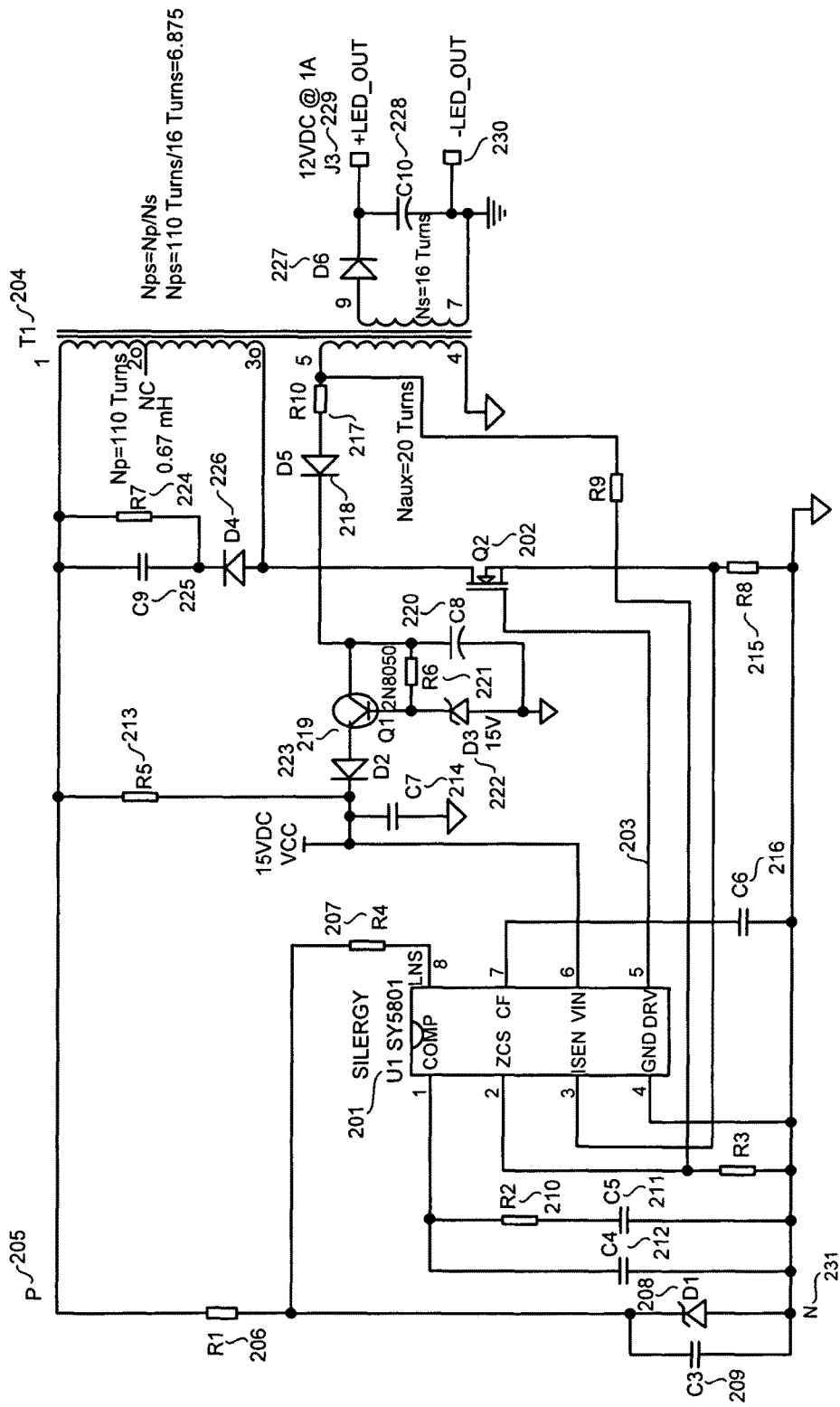
FIG. 2 is a primary side regulation flyback converter of a kind which can be used in conjunction with the preferred embodiment of the invention.

Conventional flyback circuits may use filtering inductors of say, 3-4 mH. By comparison the inductor 401 used in the wave filter of this invention is relatively large, by way of illustrative example only a number of 30-40 mH may be used, although the exact size obviously will vary with the specific lighting driver circuit and its power level, and may vary greatly. FIG. 2 shows the power converter stage using the SY5801 control chip. The operation of the chip is well explained in the SY5801 data sheet. In brief the operation of this circuit is as follows. Mosfet 202 is controlled by the chip 201 to switch on and off (pulse width modulate) the current through winding Np of transformer 204. The pulse width of these switching cycles is modulated in order to allow the output current of the system to be kept constant. This transfers energy to winding Ns where the signal is rectified by diode 227 and smoothed by capacitor 228 to provide the LED current from terminals 229 and 230.

Figure 3:
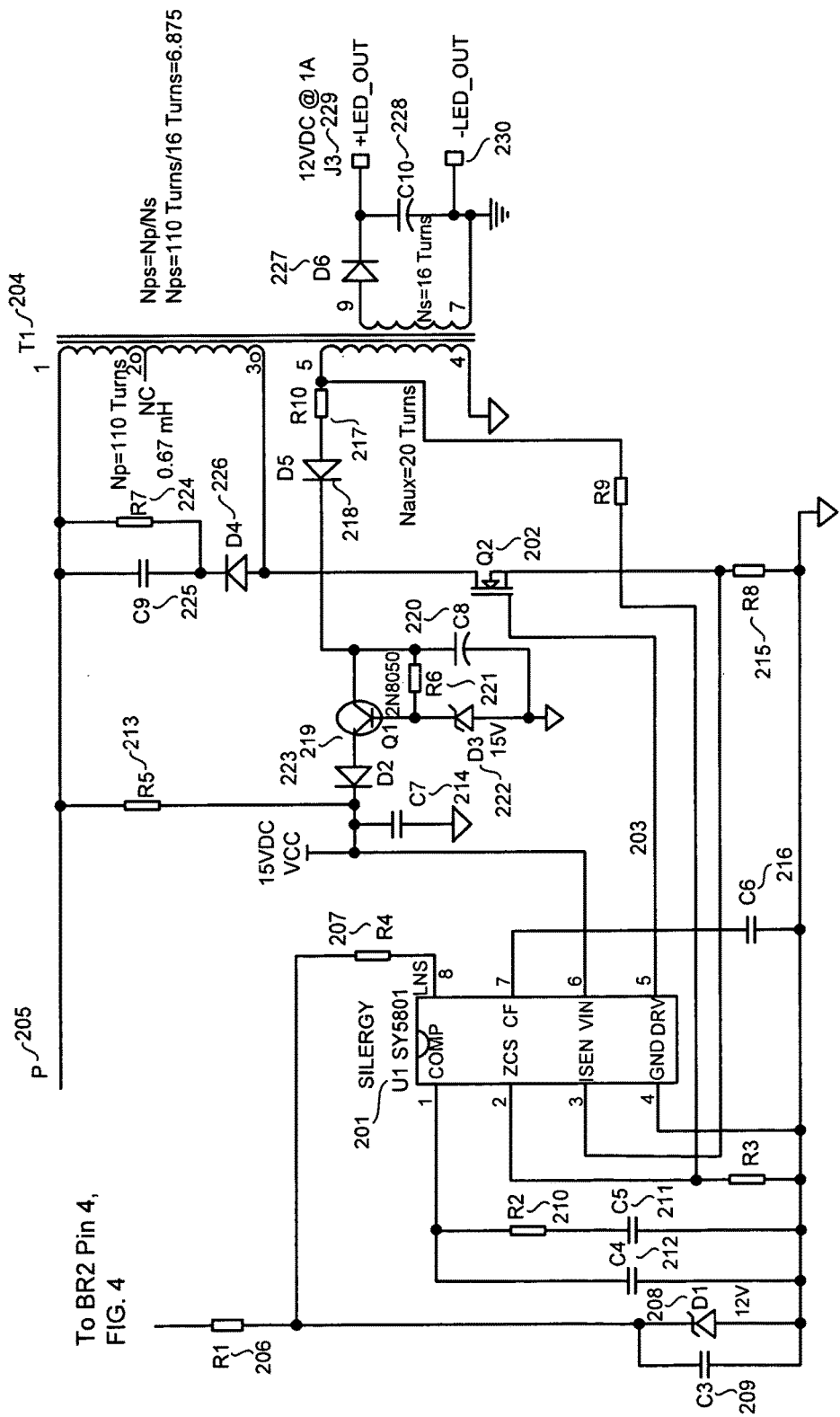
FIG. 3 is a primary side regulation flyback converter arranged so that the dimming control signal can be acquired from the positive output terminal of a bridge rectifier instead of as shown in FIG. 2.
Figure 4:
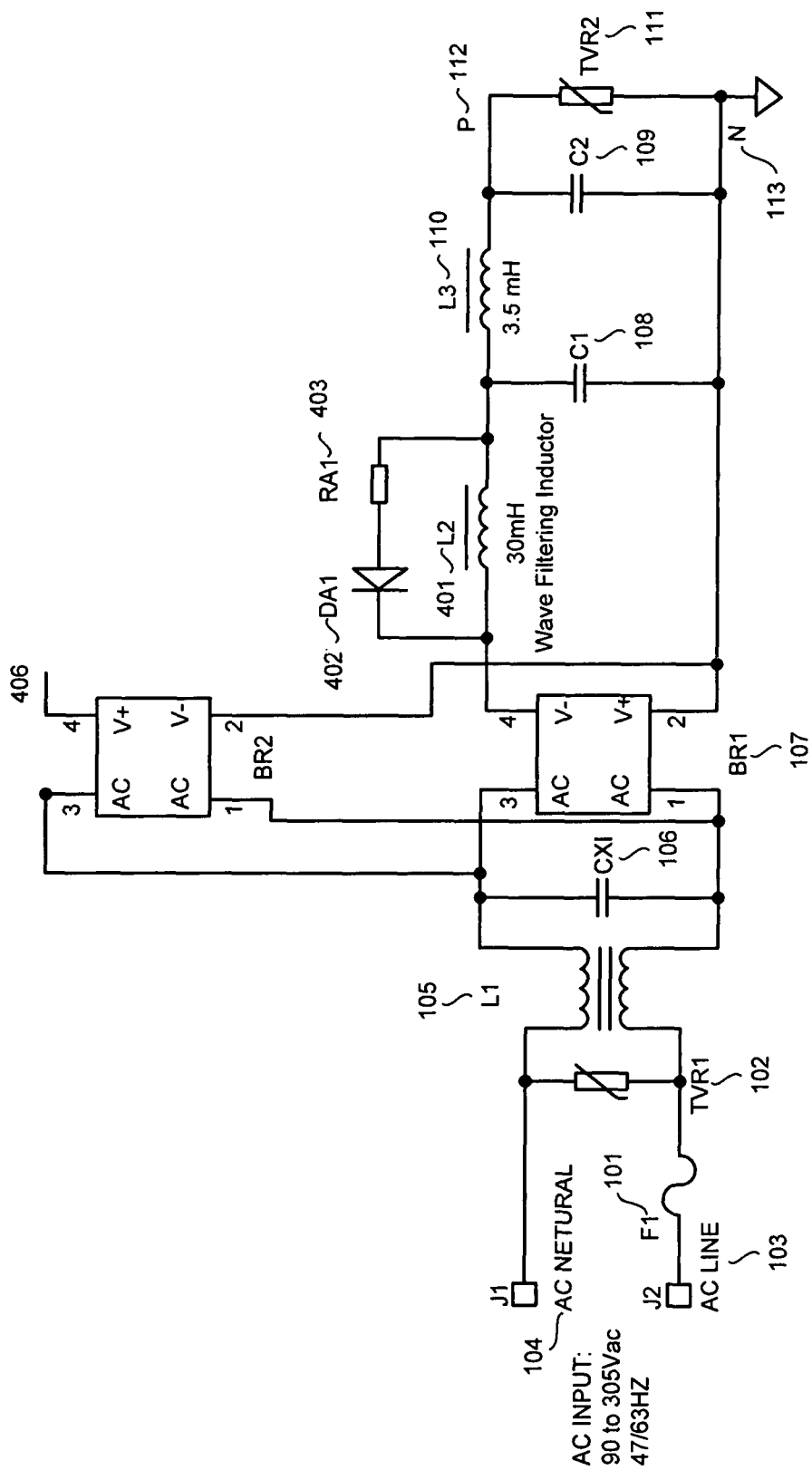
FIG. 4 is the input stage of the preferred embodiment of the invention with an extra bridge rectifier added to provide a clean phase control signal to resistor 206 in FIG. 3.

Winding Naux of transformer 204 provides auxiliary power for the control chip, by rectifying the pin 5 output with diode 218 and limiting surges with resistor 217. Transistor 219 together with resistor 21, zener diode 222 and capacitor 220 comprise a conventional voltage regulator circuit which provides a constant 15V supply for the Vin requirements of the control chip 201. Capacitor C7 lowers the impedance level of this supply for high frequencies, and diode 223 is used to protect transistor 219 at start up while resistor 213 is initially charging up reservoir capacitor 214. Diode D4 together with capacitor C9 and resistor 224 provide a conventional snubber arrangement to dissipate excessive voltage surges originating from leakage inductance in transformer 204. Capacitor 216 is to lower the high frequency impedance on the internal power supply pin 7 of chip 201. Resistor 215 is a conventional current sense resistor which senses the current through winding Np of transformer 204. It allows the chip to ensure that the saturation current of Np is not exceeded and in conjunction with the dimming input on pin 8 allows the output current to be modulated according to the desired dimming level. Resistors R9 and R3 are used to divide the voltage on transformer 204 pin 5 and present a suitably sized signal to pin 2 to allow the chip to sense a zero crossing of the primary transformer current in order to trigger each new cycle of operation. The dimming signal is derived by sensing the voltage on the positive rail and attenuating it with resistor 206 and zener diode 208. The fixed voltage of zener diode 208 squares off the detected phase control signal and capacitor 209 removes high frequency noise. Resistor 207 limits the current going into the dimming sense pin 8. Capacitors 211, 212 and resistor 210 are used to set the high frequency response of the op amp which runs the feedback loop which maintains a constant output current despite variations in input voltage. The wave filter assembly can be installed either in conjunction with the positive terminal of the bridge rectifier output, or with the negative terminal with appropriately reversed polarity of diode 402. Although the triac signal is shown being derived from node 205 in FIG. 2, that node experiences distorted voltages due to the action of inductors 401, 110 and capacitors 108 and 109. Since zener diode D208 clamps the signal at a fixed level the distortion is only in the form of time delays. As an alternative, in FIG. 3 resistor R1 is shown being connected instead to node 406, pin 4 of BR2 in FIG. 4. The addition of a separate bridge rectifier BR2 shown in FIG. 4 ensures that control chip 201 gets a clean version of the phase control signal.

Although the preferred embodiment of this invention has been described by way of example using a primary side regulation flyback, the same principles can be applied to any of the multitude of power converters known to those of skill in the art. Although a mosfet was shown being used for a flyback switch, any kind of switching device such as a bipolar transistor or IGBT could be used instead. A 120V circuit was used as an illustrative embodiment, however the same principles can be used at 100V, 200V, 220V, 277V, 347V or any other power line voltage. Although only leading edge (LE) and trailing edge (TE) dimmers were used to explain the operation of the invention, there are other kinds of hybrid (universal) dimmers which modulate both the leading edge and the trailing edge of the dimmer simultaneously. This invention is equally advantageous for these hybrid dimmers and for any kind of phase control or pulse width modulation dimmers. The preferred embodiment shows a single phase circuit, however the same principles can be applied equally to multi-phase circuits in a manner that can be contrived by those of skill in the art. The preferred embodiment showed application to LED drive circuits, which are a kind of lighting drive circuit, however the same principle can be applied to ballasts for fluorescent lamps (another kind of lighting drive circuit) which are to be phase controlled and indeed to any kind of phase controlled power converter, for any purpose, including but not limited to any kind of electronic lighting. Both LEDs and fluorescent vacuum tubes are referred to as lamps, as is any kind of light producing device.

Obviously many modifications and variations of the present invention are possible in light of the above teachings. It is therefore to be understood that within the scope of the appended claims the invention may be practiced otherwise than as specifically described. It should be understood, of course, that the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment thereof has been disclosed.

The invention claimed is:

1. A dimmable primary side regulated lighting drive circuit suitable for operation by any of trailing edge dimming, leading edge dimming or universal dimming, comprising following functions connected in succession starting from an input comprising:
   a. input terminals for connecting to a phase controlled dimming power line circuit and output terminals for connecting to a lamp, wherein the input terminals are connected to a common mode EMI filter, which is connected to a bridge rectifier unit with input and output terminals, which are connected to
   b. a phase control wave filter including an inductor, a resistor and a single diode, wherein the phase control wave filter is directly adjacent to a DC side of the bridge rectifier and containing the single diode, wherein the phase control wave filter is connected to a PI filter, wherein the wave filter has a single diode directly connected to the output terminal of the bridge rectifier.

2. The dimmable lighting drive circuit of claim 1, wherein the lamp comprises at least one light emitting diode.

3. The dimmable lighting drive circuit of claim 2, wherein the resistor is present in series with the single diode and wherein the single diode and the resistor are connected to the inductor to comprise a parallel path so that freewheeling current passes from the inductor and through both the single diode and the resistor.

4. The dimmable lighting drive circuit of claim 3, wherein the phase control dimming is chosen from the group of leading edge dimming, trailing edge dimming, or universal dimming.

* * * * *